(12) United States Patent
Krantz

(10) Patent No.: US 9,191,616 B2
(45) Date of Patent: Nov. 17, 2015

(54) LOCAL PARTICIPANT IDENTIFICATION IN A WEB CONFERENCING SYSTEM

(75) Inventor: Anton Krantz, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 81 days.

(21) Appl. No.: 13/116,006

(22) Filed: May 26, 2011

(65) Prior Publication Data

US 2012/0300014 A1  Nov. 29, 2012

(51) Int. Cl.
*H04N 7/14* (2006.01)

(52) U.S. Cl.
CPC ............... *H04N 7/147* (2013.01); *H04N 7/142* (2013.01)

(58) Field of Classification Search
USPC .......... 348/14.01, 14.02, 14.08, 14.12, 14.14, 348/14.15, 14.09, 94, E7.083, 208.16, 348/211.12
See application file for complete search history.

(56) References Cited

U.S. PATENT DOCUMENTS

| | | | |
|---|---|---|---|
| 6,885,388 B2 | 4/2005 | Gunter et al. | |
| 7,012,630 B2 | 3/2006 | Curry et al. | |
| 7,328,029 B1 | 2/2008 | Adamczyk et al. | |
| 7,426,197 B2 | 9/2008 | Schotten et al. | |
| 7,477,281 B2* | 1/2009 | Chandra et al. | 348/14.09 |
| 2004/0141605 A1 | 7/2004 | Chen et al. | |
| 2005/0058125 A1 | 3/2005 | Mutikainen et al. | |
| 2006/0239212 A1 | 10/2006 | Pirzada et al. | |
| 2007/0188596 A1 | 8/2007 | Kenoyer | |
| 2007/0211673 A1 | 9/2007 | Anantha | |
| 2008/0240571 A1* | 10/2008 | Tian et al. | 382/190 |
| 2009/0015658 A1 | 1/2009 | Enstad et al. | |
| 2009/0086949 A1 | 4/2009 | Caspi et al. | |
| 2009/0089055 A1* | 4/2009 | Caspi et al. | 704/235 |
| 2009/0148827 A1 | 6/2009 | Argott | |
| 2009/0203317 A1 | 8/2009 | Waung | |
| 2009/0210491 A1 | 8/2009 | Thakkar et al. | |
| 2010/0005142 A1 | 1/2010 | Xiao et al. | |
| 2010/0085415 A1* | 4/2010 | Rahman | 348/14.08 |
| 2010/0149305 A1* | 6/2010 | Catchpole et al. | 348/14.08 |
| 2010/0235894 A1 | 9/2010 | Allen et al. | |
| 2010/0241845 A1 | 9/2010 | Alonso | |
| 2011/0161212 A1 | 6/2011 | Bozionek et al. | |
| 2011/0165858 A1 | 7/2011 | Gisby et al. | |
| 2011/0279631 A1 | 11/2011 | Ranganath et al. | |
| 2011/0283345 A1 | 11/2011 | Kamei et al. | |
| 2012/0185291 A1 | 7/2012 | Ramaswamy et al. | |

(Continued)

OTHER PUBLICATIONS

Hradis, et al., "Real-time Tracking of Participants in Meeting Video", Retrieved at <<http://citeseerx.ist.psu.edu/viewdoc/download-?doi=10.1.1.147.289&rep=rep1&type=pdf>>, 2006, pp. 5.

(Continued)

*Primary Examiner* — Yosef K Laekemariam
(74) *Attorney, Agent, or Firm* — Andrew Smith; Danielle Johnston-Holmes; Micky Minhas

(57) ABSTRACT

An event computer receives video in which one or more local participants of a conferencing event are viewable. The event computer receives head detection information of the local participants and assigns contextual data to the head detection information for each of the local participants for which head detection information is received. The event computer then sends the video, the head detection information, and the contextual data to one or more remote participant computer systems by which one or more remote participants can view the local participants and their corresponding contextual data within the video.

16 Claims, 7 Drawing Sheets

(56) References Cited

U.S. PATENT DOCUMENTS

2012/0327175 A1  12/2012  Couse
2013/0237240 A1   9/2013  Krantz

OTHER PUBLICATIONS

Charif, et al., "Tracking the Activity of Participants in a Meeting", Retrieved at <<http://citeseerx.ist.psu.edu/viewdoc/download-?doi=10.1.1.106.9832&rep=rep1&type=pdf>>,2006, pp. 1-14.

"Cisco Unified Videoconferencing 3545 System Release 5.7", Retrieved at http://www.cisco.com/en/US/prod/collateral/video/ps7190/ps1870/ps6963/product__data__sheet0900aecd804bbfc0.pdf>>, Retrieved Date: Feb. 22, 2011, pp. 8.

U.S. Official Action dated Sep. 17, 2013 in U.S. Appl. No. 13/413,674.

U.S. Official Action dated Mar. 1, 2013 in U.S. Appl. No. 13/413,674.

Waibel, et al., "SMaRT: The Smart Meeting Room Task at ISL", Retrieved at <<http://ieeexplore.ieee.org/stamp/stamp.jsp?tp=&arnumber=1202752, Proceedings of IEEE International Conference on acoustics, Speech, and Signal Processing, Apr. 6-10,2003, pp. 752-755.

U.S. Official Action dated Jan. 7, 2014 in U.S. Appl. No. 13/413,674.

International Search Report dated Jun. 27, 2013 in International Application No. PCT/US13/027544.

\* cited by examiner

LOCAL PARTICIPANT IDENTIFICATION IN A WEB CONFERENCING SYSTEM

BACKGROUND

Web conferencing services allow conferencing events such as meetings, training events, lectures, presentations, and the like to be shared among local and remote participants. A video feed of the local participants is often captured at the conference event site and sent to one or more remote computers by which the remote participants can view the video feed and participate in the conference event.

It is often difficult for the remote participants to know who is in a meeting room and, of those in the meeting room, who is who, without a round of introductions from the local participants. If a remote participant joins the event late or otherwise misses the introductions, the remote participant is left at a disadvantage by not knowing who the local participants are in the meeting room. This can significantly detract from the effectiveness of the conference event and minimize the remote participant's ability to contribute. This problem is not as significant in the reverse direction since a participant joining a conference event remotely is usually uniquely identified in a conference roster, such as by a session initiation protocol ("SIP") uniform resource identifier ("URI"). There is no such current mechanism to identify local conference event participants, since local participants often do not join the online portion.

It is with respect to these and other considerations that the disclosure made herein is presented.

SUMMARY

Concepts and technologies are described herein for local participant identification in a Web conferencing system. In accordance with the concepts and technologies disclosed herein, an event computer receives video in which one or more local participants of a conferencing event are viewable. The event computer also receives head detection information of the local participants and assigns contextual data to the head detection information for each of the local participants for which head detection information is received. The event computer then sends the video, the head detection information, and the contextual data to one or more remote participant computer systems by which one or more remote participants can view the local participants and their corresponding contextual data within the video.

In some embodiments, head detection information defines a region in which a detected head of one of the local participants resides. This region may be identified by a virtual frame of any shape, size, line type (e.g., solid line or any variation of a dashed line), line weight (i.e., line thickness), color, and transparency. This region may be superimposed on the video for viewing by a facilitator of the conferencing event or another party including, for example, one of the local participants.

The contextual data provides one or more remote participants with identifying information about the local participants. The contextual data may include information such as, but not limited to, names, nicknames, titles (e.g., Mr., Mrs., Dr., Professor, etc.), employers, job titles, telephone numbers, session initiation protocol ("SIP") uniform resource identifiers ("URIs"), email addresses, physical addresses, Website uniform resource locators ("URLs"), usernames for Websites or services (e.g., social networking, online forum, audio streaming, video streaming, online shopping, gaming, dating, etc.), and avatars of the local participants. The contextual data allows the remote participants to identify the local participants.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
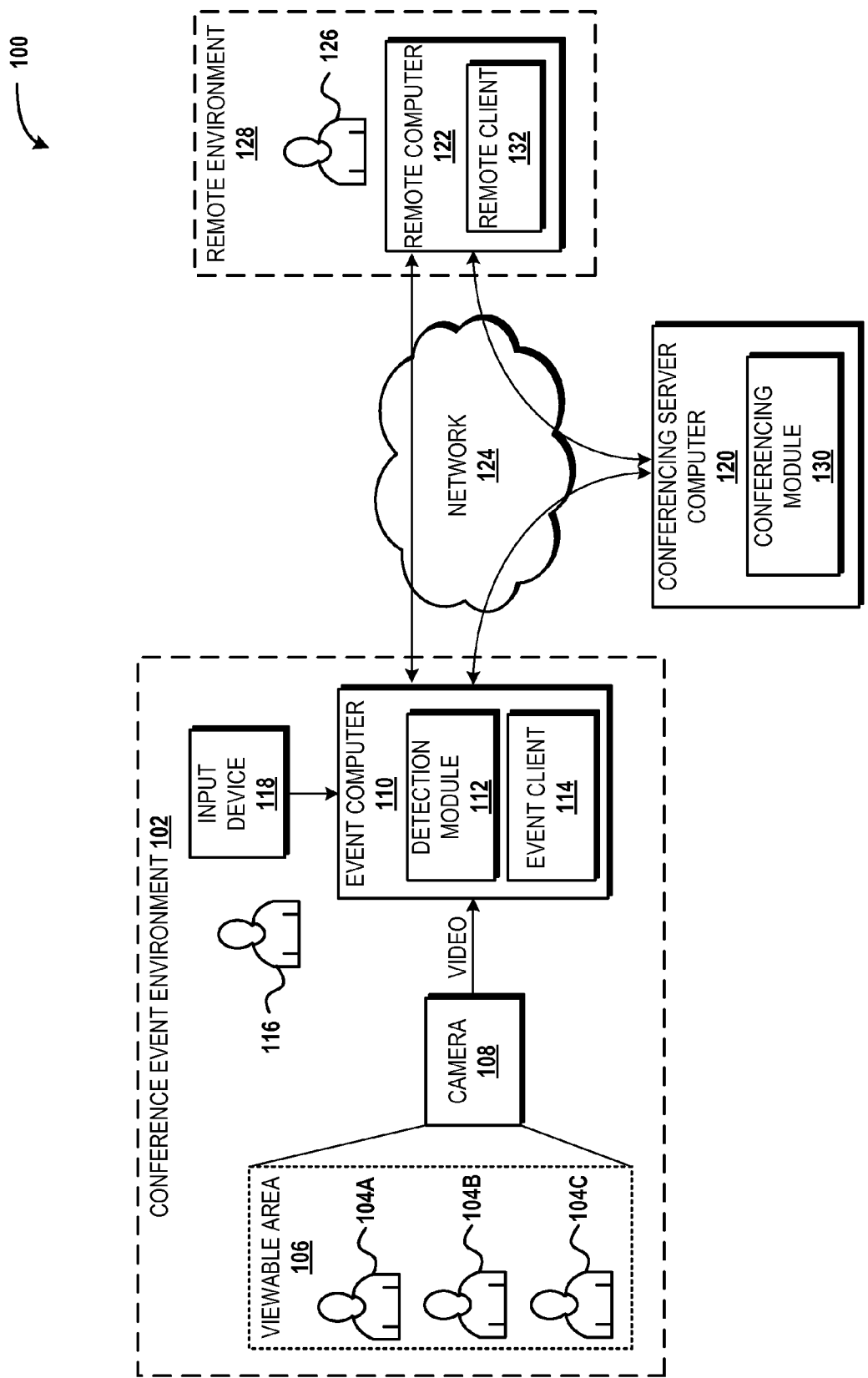
FIG. 1 is a system diagram illustrating an exemplary operating environment for the various embodiments disclosed herein.

The following detailed description is directed to concepts and technologies for local participant identification in a Web conferencing system. According to the concepts and technologies described herein, the heads of one or more local participants of a conferencing event are detected within a video, contextual data about the local participants is associated with a corresponding one of the detected heads, and the video along with the contextual data is sent to one or more remote computer systems by which one or more remote participants can view the contextual data within the video to identify the local participants.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for local participant identification in a Web conferencing system will be presented.

Referring now to FIG. 1, aspects of one operating environment 100 for the various embodiments presented herein will be described. The illustrated operating environment 100 includes a conference event environment 102 in which a conference event such as a meeting, training event, lecture presentation, or the like is being held. The conference event environment 102 may be any indoor or outdoor environment including, but not limited to, a temporary structure such as a tent or canopy; a permanent structure such as an office building, hotel, house, stadium, or a space or room contained therein; a park, yard, or other outdoor venue; or any combination thereof. The illustrated conference event environment 102 includes local participants 104A, 104B, 104C who are physically attending the conference event. The local participants 104A, 104B, 104C are sometimes collectively referred to herein as the local participants 104.

In the illustrated embodiment, the local participants 104 are located within a viewable area 106 of a camera 108. The camera 108 is configured to capture video of the local participants 104 at least during the conference event. The camera 108, in some embodiments, is a digital pan tilt zoom ("PTZ") camera, a manual PTZ camera, a panoramic camera, a two-dimensional camera, a three-dimensional camera, a combination thereof, or the like. The camera 108 may include an infrared camera and/or a microphone with any polar pattern suited to capture audio within the conference event environment 102. In some embodiments, the camera 108 is a MICROSOFT KINECT device, available from Microsoft of Redmond, Wash. In some embodiments, the camera 108 is a POLYCOM CX5000, available from Polycom of Pleasanton, Calif.

The camera 108, in some embodiments, includes a wide angle lens such that the viewable area 106 observed by the camera 108 is of sufficient width to contain at least the heads of all the local participants 104 simultaneously. It should be understood, however, that the camera 108 may have a lens that provides a viewable area less than sufficient width to contain at least the heads all the local participants 104 simultaneously. In this case, the camera 108 may be manually or automatically (e.g., via a motor attached to the camera 108) moved so as to capture video of the local participants 104 in multiple viewable areas. Moreover, the camera 108 or a portion thereof (e.g., a lens) may be appropriately selected based upon the dimensions of the conference event environment 102 or a focal point thereof. A focal point may be, for example, a presentation area such as a stage, or a table around which the local participants 104 are seated within the conference event environment 102.

The camera 108 is configured to provide video to an event computer 110. The illustrated event computer 110 includes a detection module 112 configured to utilize any head detection technology to detect the heads of the local participants 104 within the video captured by the camera 108. The particular details of head detection technologies that may be utilized are not described herein; however, those skilled in the art will appreciate the applicability of various head technologies to the various embodiments disclosed herein.

Figure 2:
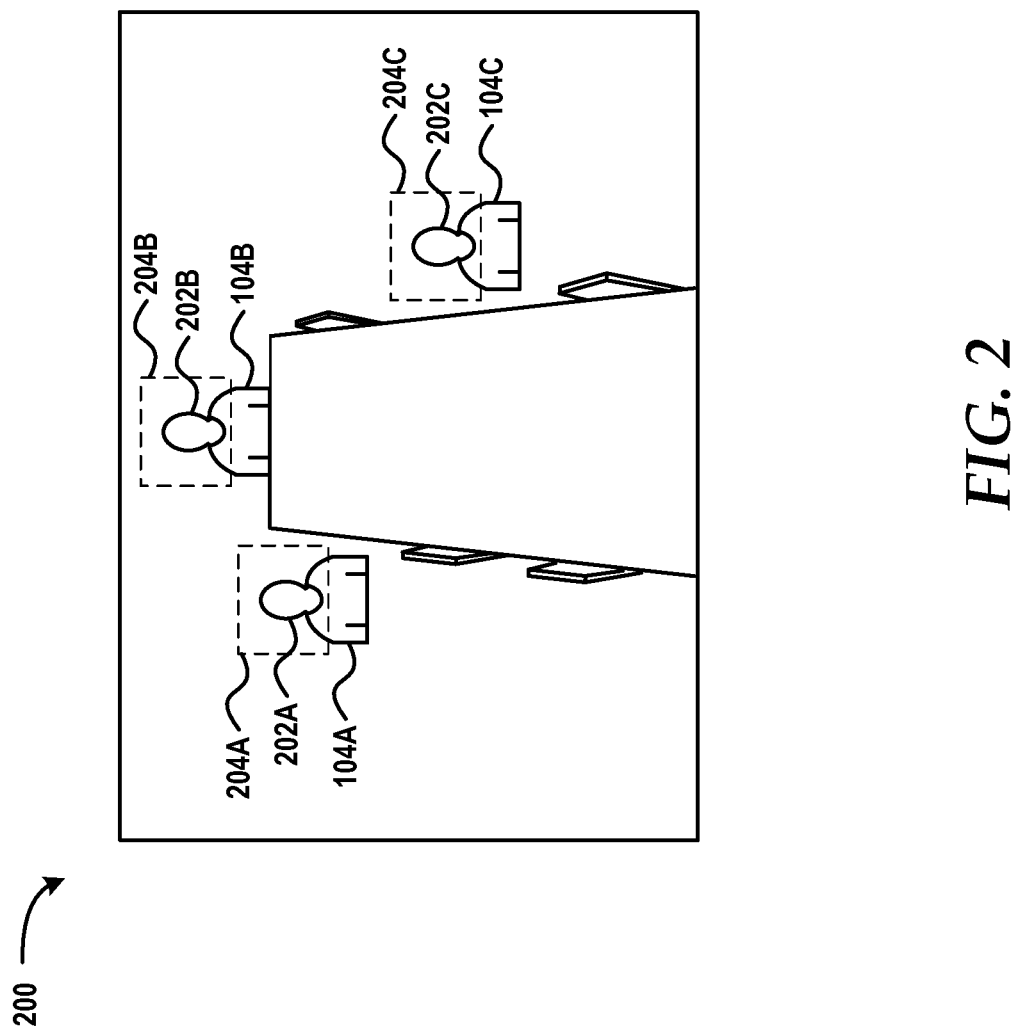
FIG. 2 is diagram illustrating a video as captured by a camera showing detected heads of local participants of a conferencing event, according to an exemplary embodiment.

In some embodiments, the detection module 112 identifies a detected head by indicating a region of a video in which the detected head resides. In some embodiments, the region in which the detected head resides is defined by a virtual frame of any shape, size, line type (e.g., solid line or any variation of a dashed line), line weight (i.e., line thickness), color, and transparency. The virtual frame may be superimposed on the video or may be superimposed on hover only (i.e., moving a cursor via a mouse or other input device over the video). Superimposition may be temporary or permanent. This is best illustrated in FIG. 2, as will be described in detail below. In some embodiments, the frame follows the various contours of a detected head such that no portion or a minimal portion of the remaining video is contained within the frame. In some embodiments, the frame includes an animation.

Other mechanisms for defining a region in which a detected head resides are contemplated and may be used alone or in combination with a frame. In some embodiments, a region is defined by manipulating a characteristic of the video within the region and/or outside of the region. Characteristics may include, but are not limited to, a frame rate (i.e., the number of still pictures per unit time of video), whether the video is interlaced or progressive, resolution, aspect ratio, color space, video quality, bit rate, three-dimensional, color, saturation, and transparency. For example, the resolution of the region may be increased, the resolution of an area surrounding the region may be decreased, or the color of the region may be changed so as to contrast the region with a surrounding area. In some embodiments, a region in which a detected head resides is superimposed with a virtual character or object. The virtual character or object may be random, selected by one of the local participants 104 or another party, or may be associated with an account of one of the local participants 104. The account may be an email account, an account associated with a particular Website such as a social networking Webs site, a shopping Website, an online forum Website, or any other Website for which an account may be created by one of the local participants 104.

In some embodiments, the detection component 112 is alternatively included as part of the camera 108. In these embodiments, the camera 108 provides the video to the event computer 110 with an indication of the regions in which the detected heads of the local participants 104 reside. In some embodiments, the detection component 112 is configured to detect portions of the local participants' 104 bodies as an alternative to or in addition to the local participants' 104 heads.

The illustrated event computer 110 also includes an event client 114 through which one or more of the local participants 104 and/or an event facilitator 116 may insert contextual data about the local participants 104 within the video. The contextual data is used to identify the local participants 104 to other participants of the conference event. Contextual data may be inserted utilizing an input device 118, such as a keyboard, keypad, mouse, touch or multi-touch screen, touch pad, trackball, joystick, gaming pad, microphone, a combination thereof, or the like.

Figure 4:
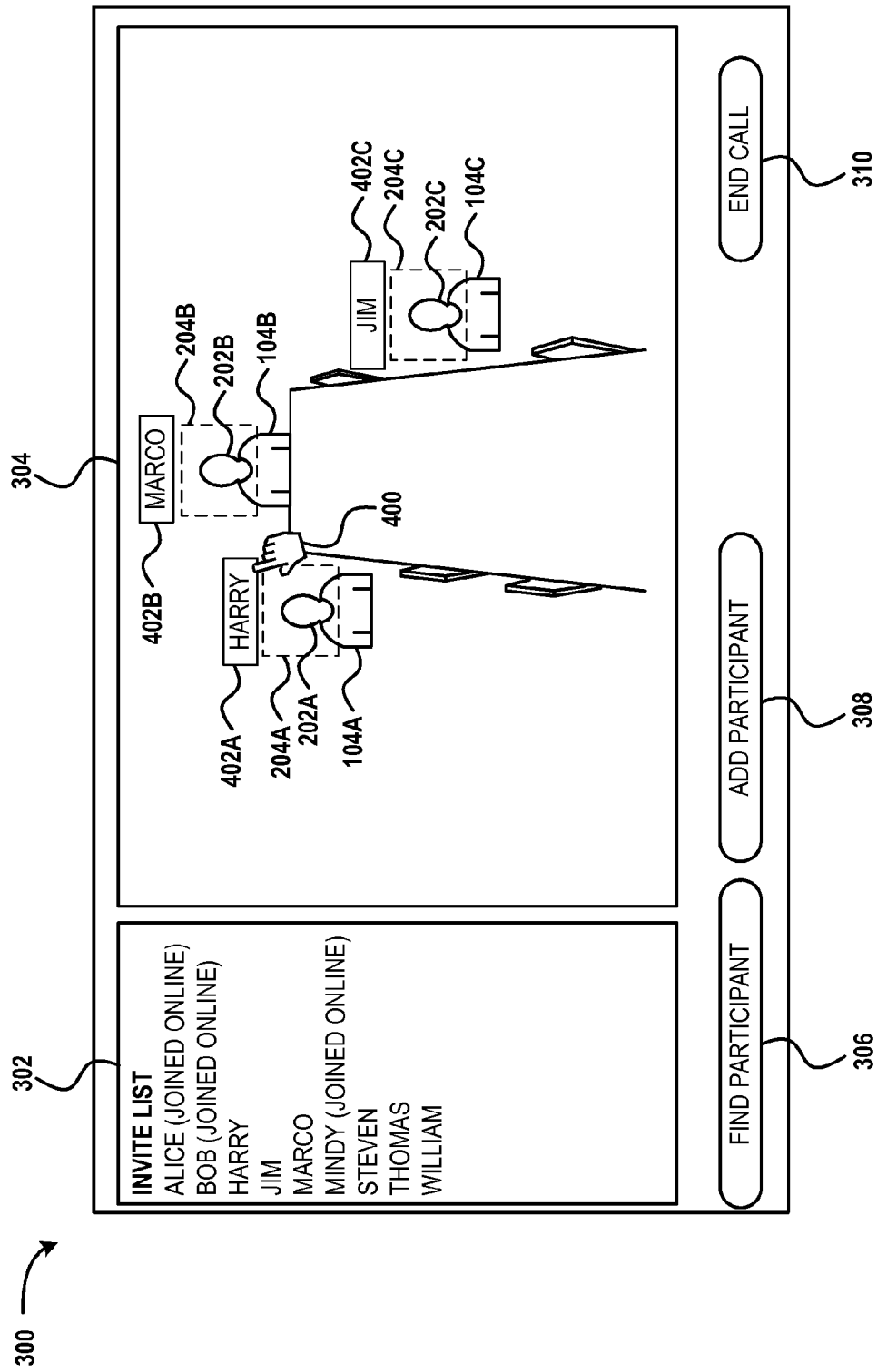
FIG. 4 is a diagram illustrating an event client user interface, according to another exemplary embodiment.

Contextual data includes, but is not limited to, names, nicknames, titles (e.g., Mr., Mrs., Dr., Professor, etc.), employers, job titles, telephone numbers, session initiation protocol ("SIP") uniform resource identifiers ("URIs"), email addresses, physical addresses, Website URLs, usernames for Websites or services (e.g., social networking, online forum, audio streaming, video streaming, online shopping, gaming, dating, etc.), and avatars. Contextual data may be superimposed on a region of the video within which a detected head resides or a portion of the region, may be superimposed on hover only (i.e., moving a cursor via a mouse or other input device over the video). Alternatively, contextual data may be superimposed within a distance from a region such that contextual data is identifiable as being associated with particular detected head. An example of this is best illustrated in FIG. 4, wherein the name of each of the local participants 104 is inserted above a respective region for each of the local participants 104. FIG. 4 will be described in greater detail below. It should be understood that superimposition may be temporary or permanent. In some embodiments, the event computer 110 automatically populates contextual data about the local participants 104. This may be in supplement to contextual data provided by one or more of the local participants 104 and/or the event facilitator 116, or may be the sole source of contextual data about the local participants 104. In some embodiments, contextual data is sourced utilizing a recognition mechanism such as, but not limited to, facial recognition, radio frequency identification ("RFID"), or bar code identification.

For facial recognition, for example, the camera 108 or another camera (not shown) may be used to create a base image. The base image can then be stored in a database (not shown) or other memory storage (also not shown) that is accessible by the event computer 110. A base image may be used to identify one or more distinguishable facial features of one or more of the local participants 104. These facial features may be, for example, the distance between eyes, the width of the nose, the depth of the eye sockets, the location of cheekbones, the jaw line, and/or the chin. These facial features and/or other facial features may be identified by one or more nodal points of which there are roughly eighty on a human face. The number of nodal points used in detecting one of the local participants 104 may be any number that is sufficient to accurately recognize a particular feature.

Setup and/or calibration procedures may be used to create a user profile to which a base image of a participant's face is associated. User profiles may include contextual data. User profiles may be stored in a storage memory of the event computer 110 (best shown in FIG. 7) or another storage memory (not shown) that is accessible by the event computer 110.

It is contemplated that facial recognition technology may be built-in to the camera 108, may be included as part of the detection module 112, may be included as part of the event client 114, or may be provided in a standalone software module that is executable by the event computer 110 or another computer system. The particular details of face recognition technologies that may be utilized are not described herein; however, those skilled in the art will appreciate the applicability of various face recognition technologies to the various embodiments disclosed herein.

For RFID and bar codes, for example, the event computer 110 may include an RFID reader and/or a bar code reader or may be in communication with such a reader. These readers may be used to identify one or more of the local participants 104 via an RFID tag or a bar code. Contextual data stored in the RFID tag or bar code or contextual data retrieved from an external source using other data stored in the RFID tag or bar code then may be used to populate a region or a surrounding portion thereof.

It is also contemplated that the event computer 110 may include or may be in communication with (e.g., via a local network, an intranet, or an internet) a database configured to store contextual data alone or in some particular format, such as a vCard format. Contextual data corresponding to one or more of the local participants 104 may be retrieved from the database in response to the one or more of the local participants 104 being recognized via one of the aforementioned recognition mechanisms. Moreover, contextual data provided manually by one or more of the local participants 104 and/or the event facilitator 116 may be stored in the database in association with the appropriate participant for later access via one of the recognition mechanisms.

The event facilitator 116 is an individual or machine (e.g., a robot or another computer) responsible for operating the event computer 110 and/or the camera 108. The event facilitator 116, in some embodiments, is one of the local participants 104. In some embodiments, the facilitator 116 is a host of the conference event, a speaker or presenter at the conference event, a representative of the conference event, a member of an organization holding the conference event, an employee of a company holding the conference event, a sponsor of the conference event, an individual associated with a sponsor of the conference event, or the like. It is also contemplated that there may be no event facilitator or multiple event facilitators.

In the illustrated embodiment, the event computer 110 is in communication with a conferencing server computer 120 and a remote computer 122 via a network 124. The network 124 may be, for example, an internet, an intranet, or an extranet. Access to the network 124 may be provided via a wired communications network or a wireless communications network.

The remote computer 122 is operated by a remote participant 126 who is remotely accessing the conference event being held within the conference event environment 102 from within a remote environment 128. In some embodiments, the remote environment 128 is any indoor or outdoor environment located outside of the conference event environment 102. It is contemplated, however, that the remote environment 128 may be contained within the conference event environment 102. Such a case may arise, for example, when the remote participant 126 is performing testing, setup, or calibration procedures, or when one the local participants 104 also joins the conference event online.

The conferencing server computer 120 enables data collaboration among multiple participants. In the illustrated embodiment, the conferencing server computer 120 enables the event computer 110 to send contextual data within a video to the remote computer 122 via a conferencing module 130. In addition to exchanging video with the contextual data, data collaboration may include, but is not limited to, application sharing, white boarding, chat, polling, question and answer, Web sharing, other multimedia content, file transfer, and presentation software support. It should be understood that data collaboration, video or otherwise, may be bi-directional such that the remote computer 122 can also send video of the remote participant 126 to the event computer 110 for sharing with the local participants 104.

The conferencing module 130 may be server software for any Web conferencing platform, for example, MICROSOFT LIVE MEETING available from Microsoft of Redmond, Wash., CISCO UNIFIED MEETING PLACE available from Cisco of San Jose, Calif., CITRIX GOTOMEETING available from Citrix of Santa Barbara, Calif. The event client 114 and a remote client 132 (operating on the remote computer 122) may be client-side software modules configured to communicate with the conferencing software module 130 to establish, maintain, and tear down a conference session over which to share the video and the contextual data.

According to various embodiments, the event computer 110, the conferencing server computer 120, and/or the remote computer 122 are personal computers ("PC") such as desktop, tablet, or laptop computer systems. The event computer 110, the conferencing server computer 120, and/or the remote computer 122 may include other types of computing systems including, but not limited to, server computers, handheld computers, netbook computers, embedded computer systems, personal digital assistants, mobile telephones, smart phones, or other computing devices. The event computer 110, the conferencing server computer 120, and/or the remote computer 122 are configured to execute one or more applications (e.g., the detection module 112, the event client 114, the conferencing module 130, and the remote client 132) to provide the functionality described herein for inserting contextual data about the local participants 104 into a video for use during a Web conferencing event.

It should be understood that some implementations of the operating environment 100 include multiple cameras 108, multiple event computers 110, multiple input devices 118, multiple networks 124, multiple conferencing server computers 120, multiple remote computers 122, multiple conference event environments 102, multiple remote environments 128, and/or multiple software applications (e.g., detection modules 112, event clients 114, conferencing modules 130, remote clients 132). It should also be understood that some implementations include any number of local participants 104 and any number of remote participants 126. Thus, the illustrated embodiments should be understood as being exemplary, and should not be construed as being limiting in any way.

It also should be understood that, in some implementations, functionality of the event computer 110 or portions thereof (e.g., the detection module 112 and/or the event client 114) as described above is performed by the conferencing server computer 120 or another computer (not shown) that is in communication with the network 124. In some embodiments, the camera 108 is in communication with the conferencing server computer 120 or another computer (not shown) via the network 124 without an intermediary device or computer such as the event computer 110. In some embodiments, the event computer 110 merely facilitates access to the conferencing server computer 120 or another computer (not shown), which is configured to perform the various functionality described herein above. For example, in these embodiments, the event computer 110 may include a Web browser application that is configured to access one or more Web pages hosted by or for the conferencing server computer 120 that provide the functionality of the detection module 112, the event client 114, and/or other functionality described herein above. It is contemplated that such a service may be provided for free or for a cost, such as on a pay-per-use or subscription basis with or without contractual agreements.

Turning now to FIG. 2, a video 200 showing detected heads 202A, 202B, 202C (collectively detected heads 202) of the local participants 104A, 104B, 104C, respectively, will be described. The video 200 is illustrative of a sample of an exemplary video captured by the camera 108 and provided to the event computer 110 with frames 204A, 204B, 204C (collectively frames 204) superimposed in the video. Each of the frames 204A, 204B, 204C is used to indicate a region in which each the detected heads 202A, 202B, 202C are respectively located. The video 200 may be presented on a display (not shown) of the event computer 110 such that the facilitator 116 and/or one or more of the local participants 104 can populate the frames 204 with contextual data. The contextual data may additionally or alternatively be automatically populated, for example, utilizing one of the recognition mechanisms described above, in which case the frames 204 may serve as guide for where (on or within a frame) certain contextual data should be populated.

Figure 3:
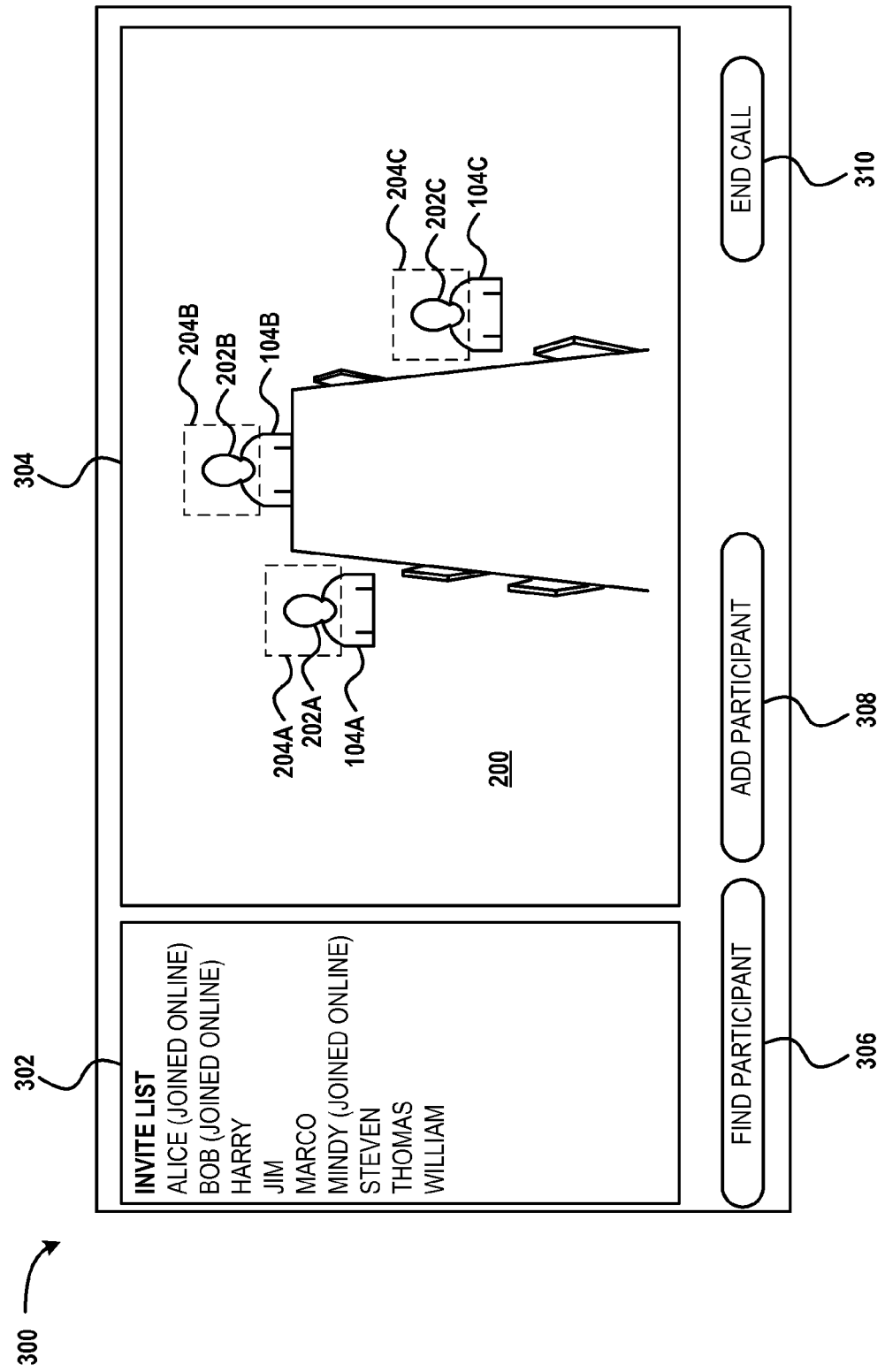
FIG. 3 is a diagram illustrating an event client user interface, according to an exemplary embodiment.

Turning now to FIGS. 3 and 4, an exemplary user interface 300 of the event client 114 will be described. The user interface 300 may be used by the facilitator 116 and/or one or more of the local participants 104 to populate the frames 204 or a surrounding area with contextual data. The illustrated user interface 300 includes an invite list 302 in which a plurality of invitees to the conference event are listed. The invitees may be local participants or remote participants. In the illustrated embodiment, invitees Alice, Bob, and Mindy are identified in the invite list 302 as having joined the conference event online. That is, these invitees are remote participants of the conference event. Moreover, these invitees are exemplary of the remote participant 126 and may join the conference event, for example, utilizing the remote computer 122 or a like-configured computer system. The other invitees have not joined the conference event online, have not physically joined the conference event at the conference event environment 102 (i.e., they simply are not physically present), or are physically present but have not yet been identified as one of the local participants 104.

The illustrated user interface 300 also includes a video window 304, a find participant button 306, an add participant button 308, and an end call button 310. The video window 304 presents video (e.g., the video 200) captured by the camera 108, any frames depicting detected heads of the local participants 104, and contextual data. The find participant button 306 allows the facilitator 116, for example, to search a local or global address book to add a participant to the invite list 302. The add participant button 308 allows the facilitator 116, for example, to add a participant by an identifier of the participant such as, but not limited to, a name, email address, or SIP URI. The end call button 310 allows the facilitator 116, for example, to end a conference session. Some or all of the illustrated user interface elements may be removed and/or other user interface elements may be added to the user interface 300. Thus, the illustrated user interface 300 is not intended to be limited in any way.

As particularly illustrated in FIG. 4, the facilitator 116 has used a cursor 400 to select a contextual data entry field 402A associated with the local participant 104A and the frame 204A in which the head 202A of the local participant 104A resides in the video. Contextual data entry fields 402B and 402C for local participants 104B, 104C are also illustrated. Upon selection with the cursor 400, the contextual data entry fields 402A, 402B, 402C can be filled with contextual data. In the illustrated embodiment, "Harry" has been dragged and dropped from the invite list 302 into entry field 402A. The entry field 402A alternatively may be selected and a name from the invite list 302 subsequently selected to be associated with the entry field 402A, or vice versa. Alternative mechanisms for inputting contextual data include, but are not limited to, manual entry (i.e., typing a name), right-click functions, gesture inputs, and voice control input. Moreover, additional contextual data may be associated with the names in the invite list 302. All or a portion of this additional contextual data may also be associated with a contextual data entry field.

In some embodiments, the facilitator 116 knows which invitee corresponds to which of the local participants 104 ahead of assigning contextual data. In some embodiments, the contextual data is obtained by a roll call of the local participants 104 such that each of the local participants 104 identifies contextual data associated with themselves. Contextual data may also be obtained via a directional microphone which identifies a speaker and associates contextual data uttered by the speaker with a corresponding one of the local participants 104 through the use of a speech-to-text technology.

Figure 5:
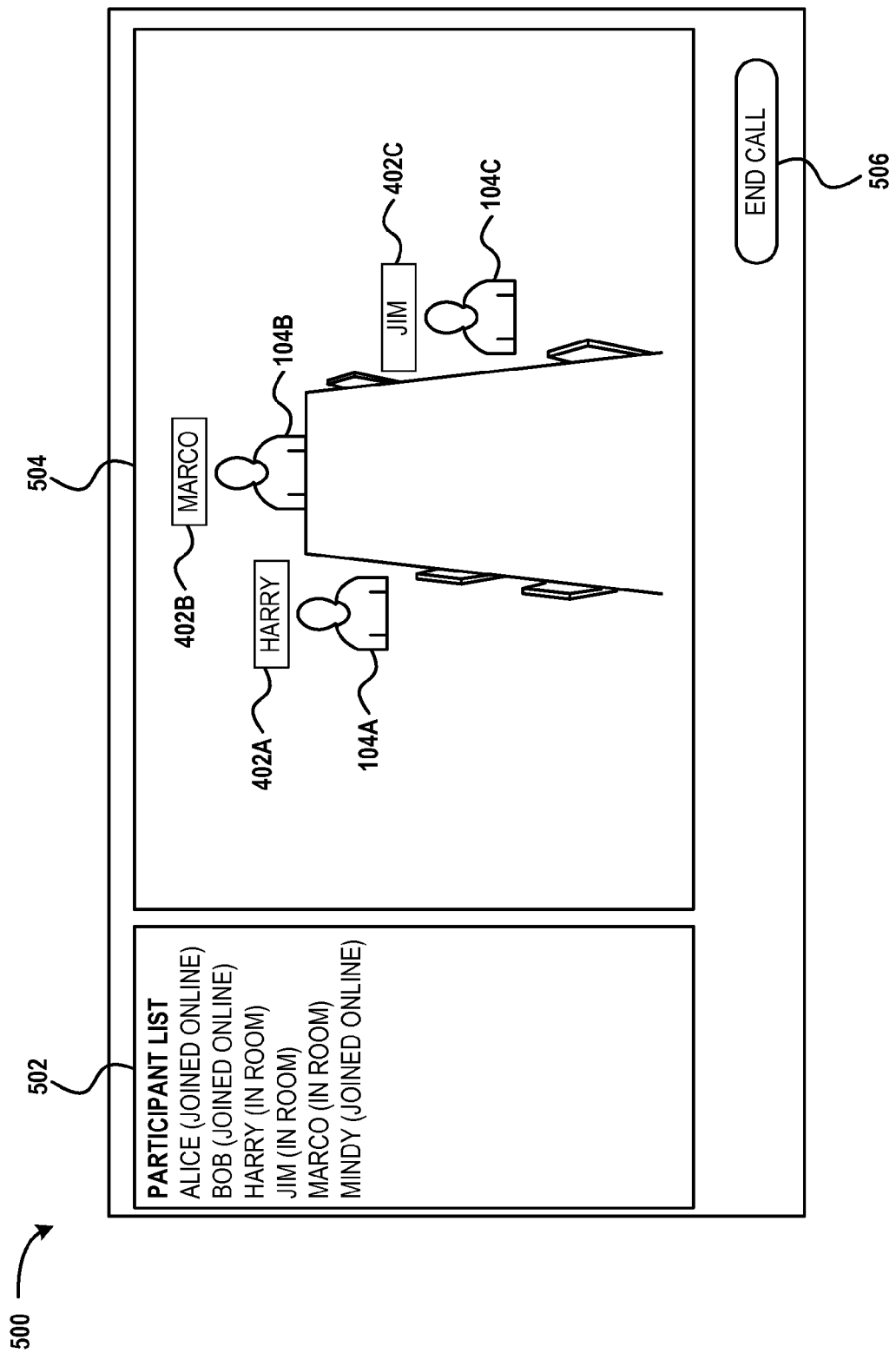
FIG. 5 is a diagram illustrating a remote client user interface, according to an exemplary embodiment.

Turning now to FIG. 5, a remote client user interface 500 will be described. The illustrated remote client user interface 500 includes a participant list 502 including remote participants Alice, Bob, and Mindy who have joined the conference event online and local participants Harry, Marco, and Jim. Harry, Marco, and Jim have been identified as the local participants 104A, 104B, 104C, respectively, by the facilitator 116 through the event client user interface 300 described above with respect to FIGS. 3 and 4. The remote client user interface 500 also includes a video feed window 504 in which the video containing contextual data (illustrated as names only) for the local participants 104 is presented. An end call button 506 similar to the end call button 310, described above, is also illustrated. Some or all of the illustrated user interface elements may be removed and/or other user interface elements may be added to the remote client user interface 500. Thus, the illustrated remote client user interface 500 is not intended to be limited in any way.

Figure 6:
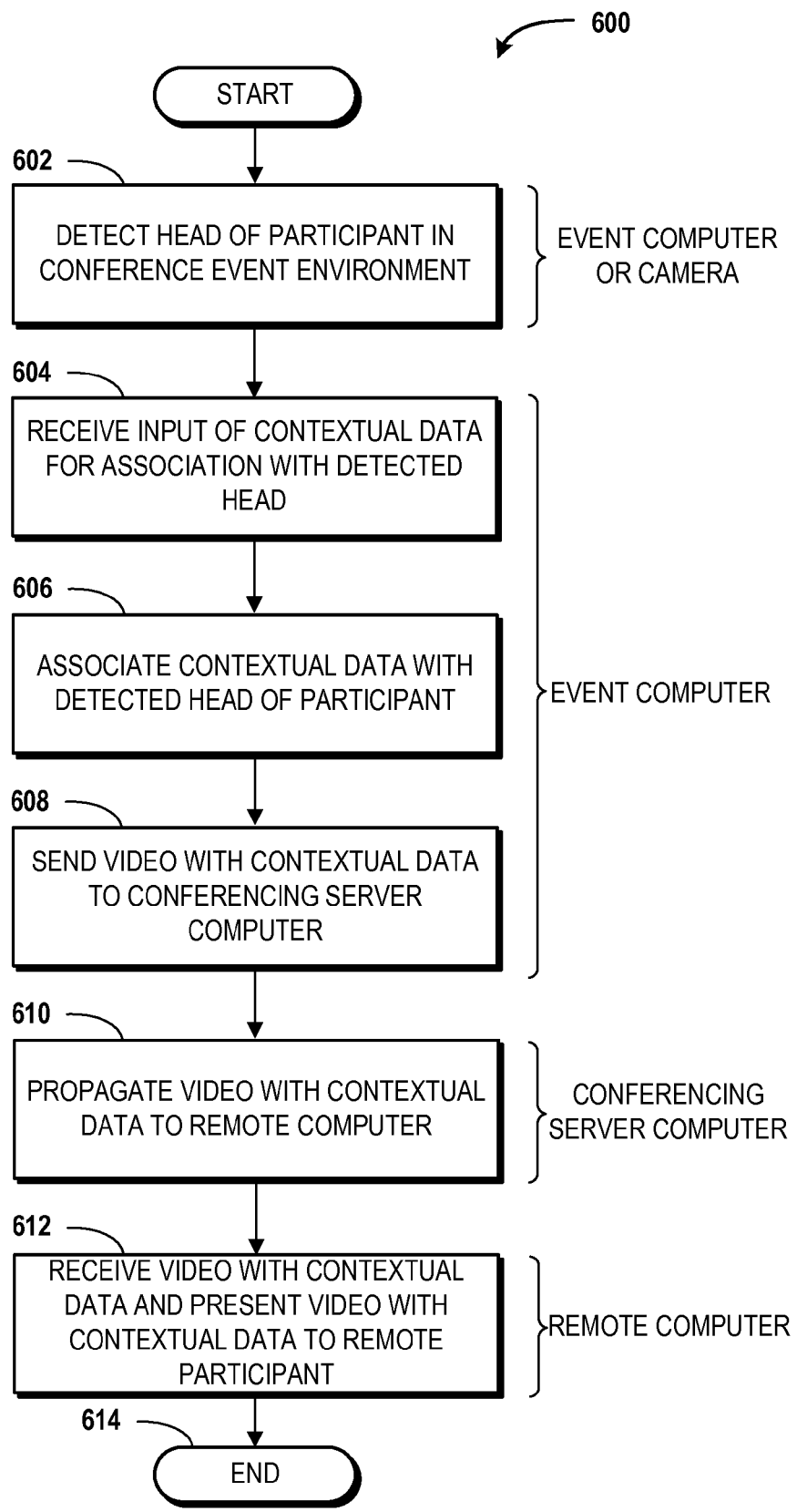
FIG. 6 is a flow diagram showing aspects of a method for identifying local participants of a conferencing event to remote participants of the conferencing event, according to an exemplary embodiment.

Turning now to FIG. 6, aspects of a method 600 for identifying local participants of a conferencing event to remote participants of the conferencing event will be described in detail. It should be understood that the operations of the method 600 disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated method 600 can be ended at any time and need not be performed in its entirety. Some or all operations of the method 600, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the method 600 disclosed herein is described as being performed by the camera 108, the event computer 110, the conferencing server computer 120, and/or the remote computer 122. It should be understood that these embodiments are exemplary, and should not be viewed as being limiting in any way.

The method 600 begins at operation 602, wherein the camera 108 or the event computer 110 detects the head of one of the local participants 104 (e.g., the local participant 104A) in the conference event environment 102. The detected head may be identified by a region that is defined by a virtual frame or other mechanism described herein above. A video feed including video (e.g., live or delayed) of the local participant 104A and the virtual frame (e.g., the frame 204A) in which the detected head resides may be displayed by the event computer 110 on a monitor, projector, or the like display device.

From operation 602, the method 600 proceeds to operation 604, wherein the event computer 110 receives contextual data about the local participant 104A. The contextual data is for association with the detected head. As described in detail above, the contextual data may be a name and/or other identifying information of the participant that may be useful to a remote participant (e.g., the remote participant 126) in identifying or otherwise contextualizing the local participant 104A and his or her participation, or lack thereof, in the conference event. Moreover, the contextual data may be input manually by the facilitator 116 or one or more of the local participants 104, or may be input automatically via a recognition mechanism, such as the recognition mechanisms as described above in detail.

From operation 604, the method 600 proceeds to operation 606, wherein the event computer 110 associates the contextual data with the detected head of the participant. In some embodiments, this association is made in accordance with an extensible markup language ("XML") schema that is understood by the event client 114 and the remote client 132. The XML schema is used to identify a participant and associated contextual data with the participant. The XML schema may include elements such as, but not limited to, a participant identifier for the conference event (e.g., a SIP URI, an email address, a name, a friendly name, a universally unique identifier, a globally unique identifier, an integer, a hexadecimal value, etc.), contextual data, identified regions of a video to define what part of a video includes a detected head (e.g., coordinates which identify the location of a head within a video frame), metadata about a participant (e.g., title, company, job function, etc.), and/or size information for the identified regions. In the case where a participant does not have a SIP URI but has either been invited to the conference event or enters their name contemporaneously with the conference event, a participant identifier such as, but not limited to, an email address or a friendly name can be used. An XML document including some or all of these elements can be created with or after the association of contextual data with the detected head.

The method 600 then proceeds to operation 608, wherein the event computer 110 sends the video feed, within which the contextual data is contained, to the conferencing server computer 120. In some embodiments, an XML document, such as created above, is sent to the conferencing server computer 120 with the video feed. In some embodiments, the XML document is sent in a SIP_info message. In other embodiments, the XML document is sent in a C3P conferencing protocol message. Other formats in which to send the XML document are contemplated.

At operation 610, the conferencing server computer 120 receives the video feed, locates the remote computer 122 as being a target end-point for the video feed, and propagates the video feed to the remote computer 122. The conferencing server computer 120 may also locate one or more other target end-points (e.g., other remote computers) that are setup to receive the video feed and propagate the video feed to those end-points.

The remote computer 122 receives the video feed at operation 612 and presents the video contained therein along with the contextual data to the remote participant 126. The video may be presented, for example, on a monitor, projector, or the like display device. The method 600 then proceeds to operation 614, wherein the method 600 ends.

Alternatively, at operation 606, the event computer 110 may send the video feed directly to the remote computer 122, bypassing the conferencing server computer 120. In this embodiment, a peer-to-peer connection may be established between the event computer 110 and the remote computer 122. Moreover, in this embodiment, the method 600 bypasses the operation 608 and proceeds directly to operation 610 and the method 600 resumes as described above for the remainder of the operations 612, 614.

Figure 7:
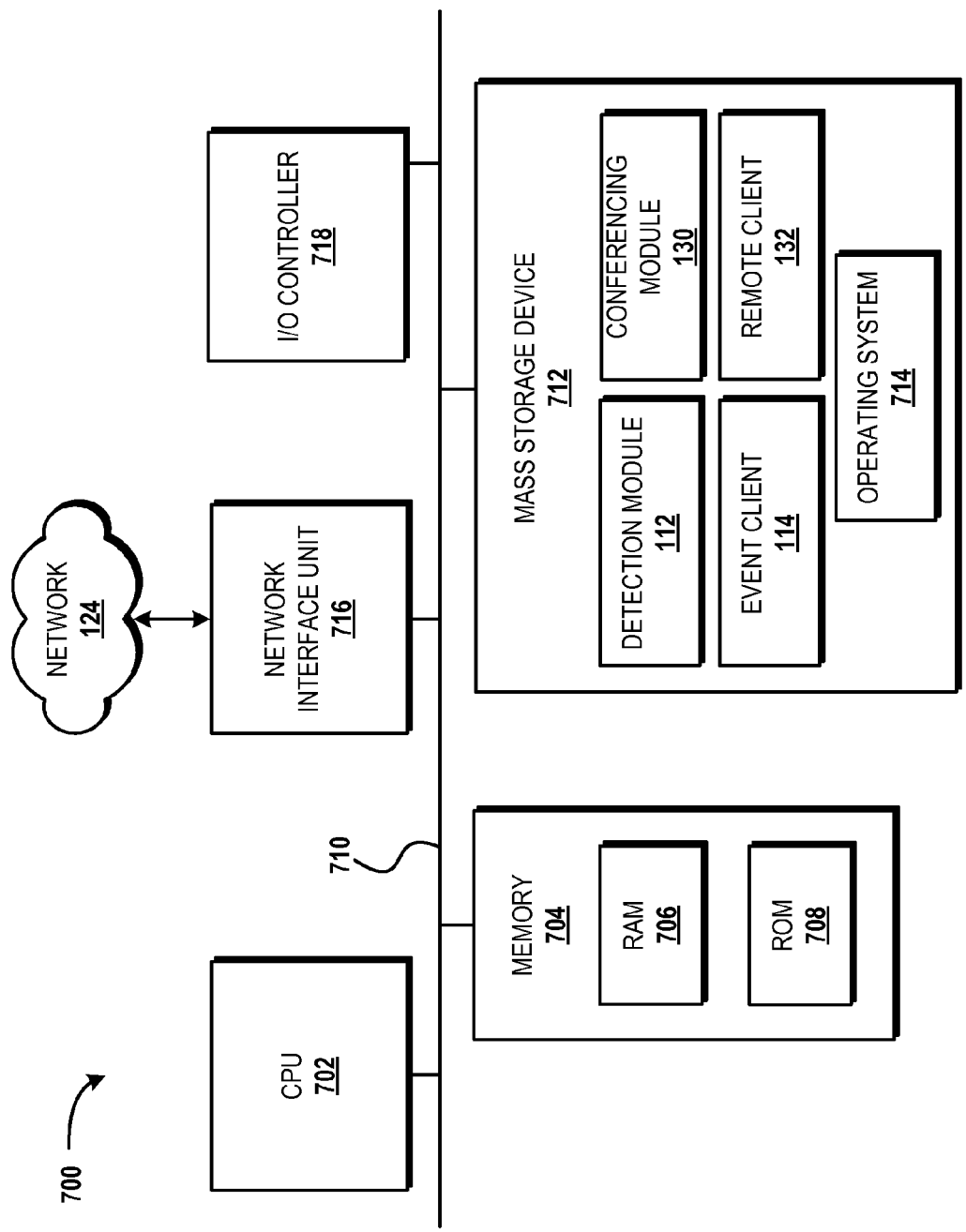
FIG. 7 is a computer architecture diagram illustrating an exemplary computer hardware and software architecture for a computing system capable of implementing aspects of the embodiments presented herein.

FIG. 7 illustrates an exemplary computer architecture 700 for a device capable of executing the software components described herein for local participant identification in a Web conferencing system. Thus, the computer architecture 700 illustrated in FIG. 7 illustrates an architecture for a server computer, mobile phone, a PDA, a smart phone, a desktop computer, a netbook computer, a tablet computer, and/or a laptop computer. The computer architecture 700 may be utilized to execute any aspects of the software components presented herein.

The computer architecture 700 illustrated in FIG. 7 includes a central processing unit 702 ("CPU"), a system memory 704, including a random access memory 706 ("RAM") and a read-only memory ("ROM") 708, and a system bus 710 that couples the memory 704 to the CPU 702. A basic input/output system containing the basic routines that help to transfer information between elements within the computer architecture 700, such as during startup, is stored in the ROM 708. The computer architecture 700 further includes a mass storage device 712 for storing the operating system 714, the detection module 112, the event client 114, the conferencing module 130, and the remote client 132.

The mass storage device 712 is connected to the CPU 702 through a mass storage controller (not shown) connected to the bus 710. The mass storage device 712 and its associated computer-readable media provide non-volatile storage for the computer architecture 700. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes the claims, the phrase "computer storage medium" and variations thereof, does not include waves, signals, and/or other transitory and/or intangible communication media, per se.

According to various embodiments, the computer architecture 700 may operate in a networked environment using logical connections to remote computers through a network such as the network 124. The computer architecture 700 may connect to the network 124 through a network interface unit 716 connected to the bus 710. It should be appreciated that the network interface unit 716 also may be utilized to connect to other types of networks and remote computer systems, for example, wired or wireless access networks and other computer systems located within the conference event environment 102 or the remote environment 128. The computer architecture 700 also may include an input/output controller 718 for receiving and processing input from a number of other devices, including a keyboard, mouse, or electronic stylus (not shown in FIG. 7). Similarly, the input/output controller 718 may provide output to a display screen, a projector, a printer, or other type of output device (also not shown in FIG. 7).

It should be appreciated that the software components described herein may, when loaded into the CPU 702 and executed, transform the CPU 702 and the overall computer architecture 700 from a general-purpose computing system into a special-purpose computing system customized to facilitate the functionality presented herein. The CPU 702 may be constructed from any number of transistors or other discrete circuit elements, which may individually or collectively assume any number of states. More specifically, the CPU 702 may operate as a finite-state machine, in response to executable instructions contained within the software modules disclosed herein. These computer-executable instructions may transform the CPU 702 by specifying how the CPU 702 transitions between states, thereby transforming the transistors or other discrete hardware elements constituting the CPU 702.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 may include other types of computing devices, including hand-held computers, embedded computer systems, personal digital assistants, and other types of computing devices known to those skilled in the art. It is also contemplated that the computer architecture 700 may not include all of the components shown in FIG. 7, may include other components that are not explicitly shown in FIG. 7, or may utilize an architecture completely different than that shown in FIG. 7.

Based on the foregoing, it should be appreciated that technologies for local participant identification in a Web conferencing system have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

I claim:

1. A computer-implemented method for identifying a local participant of a conferencing event within a video of the conferencing event, the computer-implemented method comprising performing computer-implemented operations for:
    detecting a head of the local participant within the video;
    in response to detecting the head of the local participant within the video, indicating a region in the video in which the detected head resides, the region being indicated by a virtual frame;
    receiving contextual data for the local participant and associating the contextual data with the local participant of the conferencing event detected within the video; and
    sending the video, the contextual data, and a location of the virtual frame within the video to a remote computer system participating in the conferencing event.

2. The computer-implemented method of claim 1, wherein the contextual data is at least one of an employer, a telephone number, a session initiation protocol ("SIP") uniform resource identifier ("URI"), an email address, a Website uniform resource locator ("URL"), a username for a Website or service, or an avatar of the local participant.

3. The computer-implemented method of claim 1, further comprising receiving second contextual data for a second local participant and associating the second contextual data with the second local participant, and wherein associating the contextual data with the local participant and associating the second contextual data with the second local participant comprises superimposing the contextual data on the video and superimposing the second contextual data on the video such that the contextual data and the second contextual data distinctly identify the local participant and the second local participant, respectively.

4. A computer-implemented method for identifying a local participant of a conferencing event within a video of the conferencing event, the computer-implemented method comprising performing computer-implemented operations for:
    displaying the video of the conferencing event, the video containing the local participant;
    indicating a region in the video in which a detected head of the local participant resides, the region being indicated by a virtual frame;
    receiving input of contextual data;
    associating the contextual data with the virtual frame; and
    sending the video, the contextual data, and a location of the virtual frame to a remote computer system participating in the conferencing event.

5. The computer-implemented method of claim 4, wherein the contextual data is at least one of an employer, a telephone number, a session initiation protocol ("SIP") uniform resource identifier ("URI"), an email address, a Website uniform resource locator ("URL"), a username for a Website or service, or an avatar of the local participant.

6. The computer-implemented method of claim 4, wherein the remote computer system comprises one of a client computer operated by a remote participant of the conferencing event or a server computer configured to receive the video and the XML document and propagate the video and the XML document to another remote computer system.

7. A computer storage medium having computer readable instructions stored thereupon that, when executed by a computer, cause the computer to:
    receive input of contextual data within a video, the contextual data being for association with a detected head of a local participant of a conferencing event;
    indicate a region in the video in which the detected head resides, the region being indicated by a virtual frame;
    associate the contextual data with the detected head of the local participant within the video; and
    send the video, the contextual data, and a location of the virtual frame to a remote computer system participating in the conferencing event.

8. The computer-implemented method of claim 1 in which the virtual frame follows contours of the detected head.

9. The computer-implemented method of claim 4, wherein the virtual frame follows contours of the detected head.

10. The computer storage medium of claim 7, wherein the computer readable instructions stored thereon, when executed by the computer, further cause the computer to cause the virtual frame to follow contours of the detected head.

11. The computer-implemented method of claim 1 further comprising:
    creating an extensible markup language ("XML") document comprising at least the contextual data and the location of the virtual frame within the video; and
    wherein
    sending the video, the contextual data, and the location of the virtual frame comprises sending the video and the XML document.

12. The computer-implemented method of claim 4 further comprising:
creating an extensible markup language ("XML") document comprising at least the contextual data and the location of the virtual frame within the video; and wherein
sending the video, the contextual data, and the location of the virtual frame comprises sending the video and the XML document.

13. The computer storage medium of claim 7, wherein the computer readable instructions stored thereon, when executed by the computer, further cause the computer to:
create an extensible markup language ("XML") document comprising at least the contextual data and the location of the virtual frame within the video; and wherein
send the video, the contextual data, and the location of the virtual frame as the video and the XML document.

14. The computer-implemented method of claim 4 further comprising:
creating an extensible markup language ("XML") document which identifies the region of the video in which the detected head resides; and
wherein sending the video, the contextual data, and the location of the virtual frame comprises sending the video and the XML document.

15. The computer-implemented method of claim 4 further comprising:
creating an extensible markup language ("XML") document which identifies the region of the video in which the detected head resides; and
wherein sending the video, the contextual data, and the location of the virtual frame comprises sending the video and the XML document.

16. The computer storage medium of claim 7, wherein the computer readable instructions stored thereon, when executed by the computer, further cause the computer to:
create an extensible markup language ("XML") document which identifies the region of the video in which the detected head resides; and
send the video, the contextual data, and the location of the virtual frame as the video and the XML document.

* * * * *